Aug. 18, 1936.  A. W. HARRIS  2,051,704
BEARING MOUNTING
Filed Feb. 11, 1935  2 Sheets-Sheet 2

INVENTOR:
ARTHUR W. HARRIS,
BY
HIS ATTORNEY.

Patented Aug. 18, 1936

2,051,704

UNITED STATES PATENT OFFICE 2,051,704

BEARING MOUNTING

Arthur W. Harris, Toledo, Ohio, assignor to General Motors Corporation, Detroit, Mich., a corporation of Delaware Application February 11, 1935, Serial No. 5,999

13 Claims. (Cl. 308—236)

This invention relates to bearing mountings and comprises all of the features of novelty herein disclosed. An object of the invention is to provide improved means for removably securing and locating one member in another, such for instance as an antifriction bearing in a housing. Another object is to provide a bearing mounting for transmissions and the like wherein a lubricant passage receives a portion of the bearing holding means and facilitates removal of the latter or assembly of the bearing with the support.

To these ends and also to improve generally upon devices of this character, the invention consists in the various matters hereinafter described.

In its broader aspects, the invention is not necessarily limited to the specific construction selected for illustrative purposes in the accompanying drawings in which Fig. 1 is a rear end view of a portion of a transmission housing, parts of the structure being broken away and in section.

Figure 1:
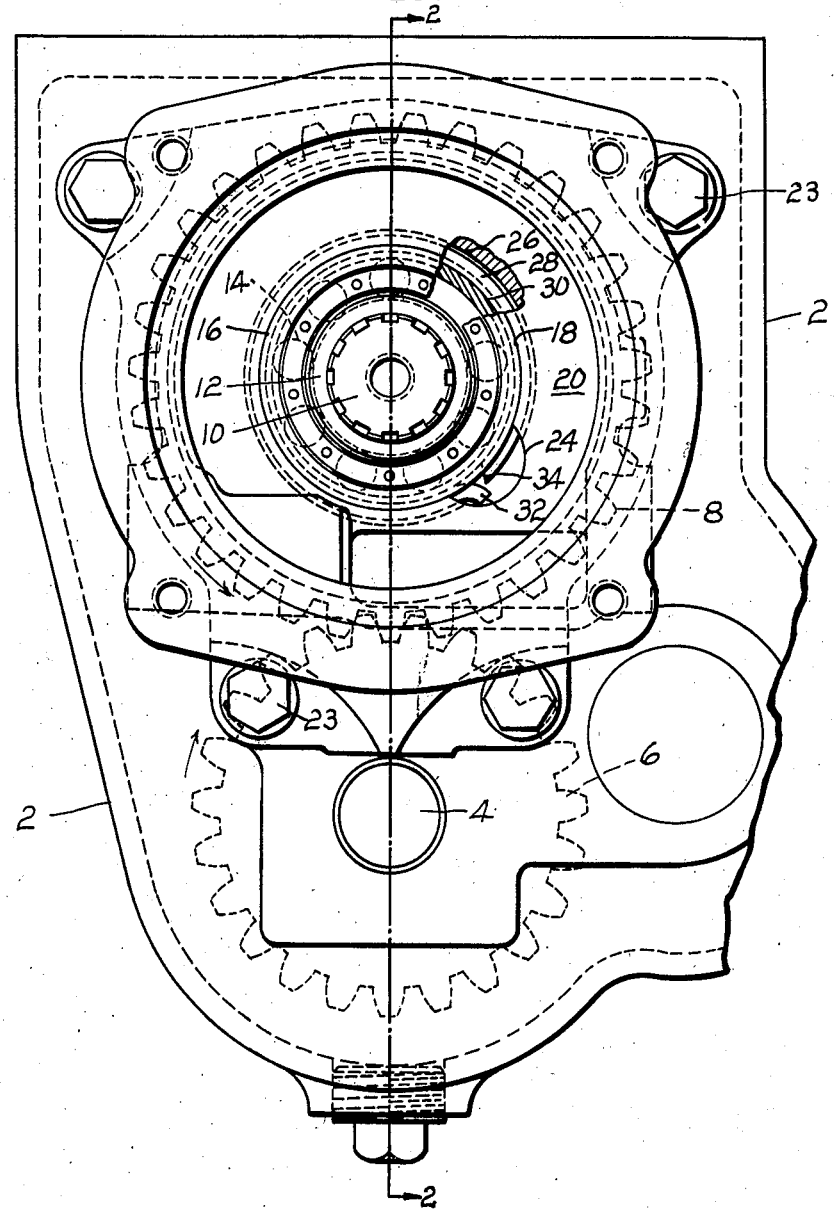
Figure 2:
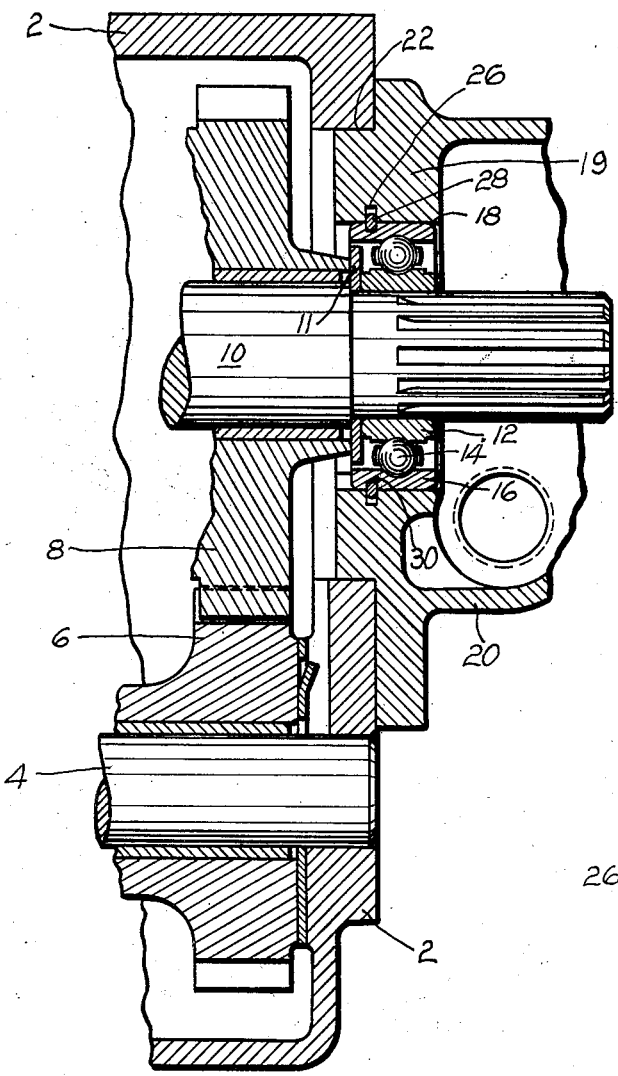
Fig. 2 is a sectional view on the line 2—2 of Fig. 1.
Figure 3:
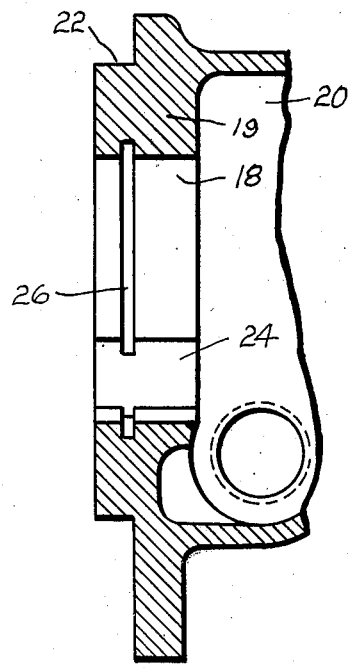
Fig. 3 is a sectional view of a portion of a housing.

The numeral 2 indicates a transmission housing having the usual fixed shaft 4 rotatably supporting a pinion 6 meshing with a gear 8 on a shaft 10, the directions of rotation of the gears being indicated by arrows in Fig. 1. The shaft 10 is splined for connection with a universal joint (not shown) and carries a slinger or abutment washer 11 next to the inner race ring 12 of an antifriction bearing herein shown as a ball bearing 14 whose outer race ring 16 is wider than the inner race ring to contain the slinger. The inner race ring preferably has a press fit on the shaft while the outer race ring preferably has a tapping fit in a bearing seat 18 on a member 19 which is a part of an extension housing 20. The extension housing has a shouldered portion 22 fitting an opening in the housing 2, the housing 20 being suitably secured to the housing 2, as by bolts 23. The member 19 forms a partition between the housings as well as a bearing support.

The seat 18 is preferably cylindrical except for interruptions to the continuity provided by a longitudinal slot 24 and an intersecting peripheral groove 26. A bearing holding and locating means, preferably comprising a split ring 28, fits partially in the groove 26 and partially in a registering groove 30 of the race ring 16, the split ring preferably having inherent tendency to contract to engage the bottom of the groove 30. The split ring has one end bent outwardly to form a lug 32 entering the slot 24 and the other end terminates in an undercut or inclined edge 34. At assembly, the split ring is first contracted to pass it through the seat 18 to the groove 26 the latter being of sufficient depth to allow the split ring to be sprung or expanded wholly into it, thus providing for assembly or disassembly of the bearing and the seat-forming member by relative axial movement.

For thus expanding the split ring during assembly, it is convenient to use a tapered cone having a major diameter slightly less than the outside diameter of the bearing and located with respect to the bearing by a pilot member passed through the bore of the bearing. When the cone and bearing are then pushed into the bearing seat, the cone expands the split ring into the groove 26 and the bearing following the cone keeps the ring expanded until the grooves 26 and 30 are in registration whereupon the tension of the ring causes it to snap into the groove 30. To disassemble, it is convenient to use a tapered drift or wedge which is inserted between the lug 32 and the undercut end 34 of the split ring, the tool also resting against the outside of the bearing and being moved lengthwise of the slot 24 to expand the split ring out of the bearing groove. The lug 32 always projects into the slot 24 so that the split ring cannot have any material circumferential movement and by gripping the race ring, the split ring also resists circumferential creeping of the bearing race ring in its seat. Engagement of the lug 32 with the slot 24 will anchor one end of the ring during expansion at disassembly by the tapered drift or wedge.

The location of the slot 24 with respect to the gears and to the bearing is of importance. It is preferably placed about 45° to the right of the vertical line as indicated in Fig. 1, a part of the slot being lower than the rolling elements of the bearing. The slot is on the leaving side of the gear teeth where the lubricant is not subject to built-up pressure by the gears. If the slot were placed on the entering side of the gears or near their line of centers, the built-up pressure would tend to empty the transmission lubricant through the slot. In the position shown, any lubricant leaking through the bearing to the extension housing 20 can accumulate in the latter and return to the transmission through the slot 24 without interference. The slot thus serves as a lubricant return passage as well as a receiver for the lug of the split ring and as a space for the assembling tool.

I claim:

1. In a device for securing a bearing race ring to a bearing seat, a member having a bearing seat, the continuity of the seat being interrupted by a longitudinal slot and a groove intersecting the slot, a race ring fitting the seat and having a groove adapted to register with the groove in the seat, bearing holding means in the registering grooves, one of the grooves being of sufficient depth to wholly receive the holding means when the latter is forced into such groove, the other groove being of less depth than the holding means, and the holding means having a projection in the slot where it is accessible to force the holding means into the groove of greater depth; substantially as described.

2. In a device for securing a bearing race ring to a bearing seat, a split ring, a member having a bearing seat interrupted by a circumferential groove, a race ring fitting the seat and having a circumferential groove adapted to register with the groove in the seat, one of the grooves being deep enough to wholly contain the split ring when the latter is sprung into it and the other groove having less depth than the split ring, one of the grooves being interrupted by a longitudinal slot, and the split ring having its ends terminating at the longitudinal slot which provides access for a spreading tool; substantially as described.

3. In a device for securing a bearing race ring to a bearing seat, a split ring, a member having a bearing seat whose continuity is interrupted by a circumferential groove and a longitudinal slot, a race ring fitting the bearing seat and having a circumferential groove adapted to register with the groove in the seat, the groove in the seat being deep enough to wholly contain the split ring, and one end of the split ring having a lug projecting into the longitudinal slot; substantially as described.

4. In a device for securing a bearing race ring to a bearing seat, a split ring, a member having a bearing seat whose continuity is interrupted by a circumferential groove and a longitudinal slot, a race ring fitting the seat and having a circumferential groove adapted to register with the groove in the seat, the groove in the seat being deep enough to wholly receive the split ring, the split ring having inherent tendency to bottom itself in the groove of the race ring, and the ends of the split ring being spaced apart in line with the longitudinal slot; substantially as described.

5. In a device of the character described, a housing, an extension housing, one housing containing meshing gears running in lubricant, a member having a bearing seat between the housings, a bearing in the seat, the peripheral continuity of the bearing seat being interrupted by a longitudinal slot forming a lubricant passage between the housings, and the slot being located towards the leaving side of the meshing gear teeth and out of the line of direction of load on the bearing; substantially as described.

6. In a device of the character described, a housing, an extension housing, one housing containing meshing gears running in lubricant, a member having a bearing seat between the housings, a bearing in the seat, the continuity of the bearing seat being interrupted by a longitudinal slot forming a lubricant passage between the housings, the slot being located towards the leaving side of the meshing gear teeth, the continuity of the bearing seat being further interrupted by a groove intersecting the slot, the bearing having a groove registering with the groove in the seat, bearing holding means engaging the grooves to lock the bearing from axial movement in the seat, and the holding means having a portion accessible at the slot for moving the holding means wholly into one of the grooves; substantially as described.

7. In a device of the character described, a housing, an extension housing, a member having a bearing seat between the housings, a bearing in the seat, the peripheral continuity of the bearing seat being interrupted by a longitudinal slot forming a lubricant passage between the housings, and bearing holding means engaging the bearing and the seat forming member and having a portion accessible at the slot to provide for moving the holding means out of engagement with the bearing; substantially as described.

8. In a device of the character described, a housing, an extension housing, a member having a bearing seat between the housings, a bearing in the seat, the peripheral continuity of the bearing seat being interrupted by a longitudinal slot forming a lubricant passage between the housings, the bearing and the seat having registering grooves one of which intersects the slot, and bearing holding means in the registering grooves and having a projection in the slot; substantially as described.

9. In a device of the character described, a pair of members seated one within the other, the inner member having a groove adapted to register with a groove in the outer member, one of the grooves being interrupted by a slot, holding means in the registering grooves, one of the grooves being of sufficient depth to wholly receive the holding means when the latter is forced into such groove, the other groove being of less depth than the holding means, and the holding means being accessible at the slot to force such holding means into the groove of greater depth; substantially as described.

10. In a device of the character described, a pair of members seated one within the other, the inner member having a groove adapted to register with a groove in the outer member, one of the grooves being interrupted by a slot of greater depth, holding means in the registering grooves, one of the grooves being of sufficient depth to wholly receive the holding means when the latter is forced into such groove, the other groove being of less depth than the holding means, and the holding means having a projection in the slot where it is accessible to force the holding means into the groove of greater depth; substantially as described.

11. In a device of the character described, a pair of members seated one within the other, the inner member having a circumferential groove adapted to register with a circumferential groove in the outer member, one of the grooves being interrupted by a longitudinal slot, a split ring entering both of the grooves for locking the members from shifting endwise, the ring having a lug extending into the slot, and one of the grooves being deep enough to receive the entire ring when the latter is forced into it; substantially as described.

12. In a device of the character described, a pair of members seated one within the other, the inner member having a circumferential groove adapted to register with a circumferential groove in the outer member, one of the grooves being interrupted by a longitudinal slot, a split ring in the registering grooves, one of the grooves being of sufficient depth to wholly receive the split ring when the latter is sprung into such groove, the other groove being of less depth than the split ring, the ring having its ends disposed in line with the longitudinal slot, and one of the ends being undercut; substantially as described.

13. In a device of the character described, a pair of members seated one within the other, the inner member having a circumferential groove adapted to register with a circumferential groove in the outer member, one of the grooves being interrupted by a longitudinal slot, a split ring in the registering grooves, one of the grooves being of sufficient depth to wholly receive the split ring when the latter is sprung into such groove, the other groove being of less depth than the split ring, the ring having its ends disposed in line with the longitudinal slot, one of the ends being undercut and the other end having a lug projecting into the slot; substantially as described.

ARTHUR W. HARRIS.